United States Patent [19]

Bluem

[11] 3,889,530
[45] June 17, 1975

[54] FLUID PRESSURE TESTING APPARATUS

[76] Inventor: Gary R. Bluem, 7980 Wynnwood Rd., Minneapolis, Minn. 55427

[22] Filed: June 10, 1974

[21] Appl. No.: 477,699

Related U.S. Application Data

[63] Continuation-in-part of Ser. No. 366,682, June 4, 1973, Pat. No. 3,866,563.

[52] U.S. Cl. ............................. 73/146.8; 137/228
[51] Int. Cl. ........................................ B60c 23/02
[58] Field of Search ............... 73/146.8, 146.3, 419; 137/227, 228; 116/34 R; 350/243, 244, 116, 191

[56] References Cited
UNITED STATES PATENTS

| | | | |
|---|---|---|---|
| 2,565,140 | 8/1951 | Leustig | 350/116 |
| 2,896,566 | 7/1959 | Laurie, Sr. et al. | 116/34 R |
| 2,903,888 | 9/1959 | Gföll | 73/146.8 |
| 3,177,724 | 4/1965 | Trinca | 73/146.8 |
| 3,762,799 | 10/1973 | Shapiro | 351/191 |

Primary Examiner—Donald O. Woodiel

[57] ABSTRACT

An air pressure testing apparatus connected to a conventional valve stem of a pneumatic tire is operable to provide visual color information as to the pressure of the air in the tire. The apparatus has a body mounted on the valve stem. A transparent housing is mounted on the body. A spring biased annular piston located between the housing and body has color code information. Separate colors on the piston are visually observable through the transparent housing as determined by the longitudinal position of the piston relative to the beads. An elongated plunger extended through the body is movable to open the valve in the valve stem to subject the annular piston to the air pressure of the tire. If the air pressure is above a predetermined pressure, the piston will move changing the color code observable through the beads. If the air pressure is below the predetermined pressure, the piston will not move and the color code will remain the same. The plunger is movable to a position wherein air under pressure can be introduced into the tire.

49 Claims, 16 Drawing Figures

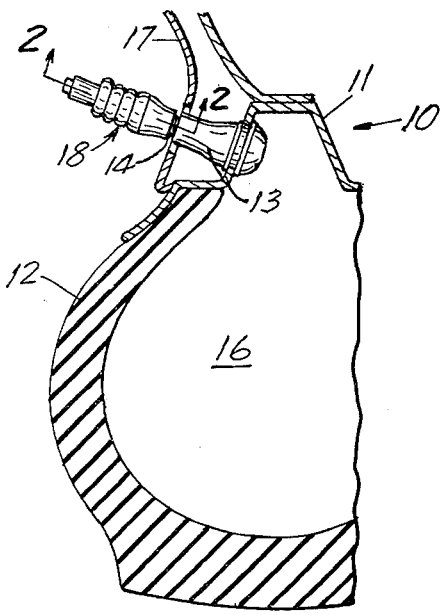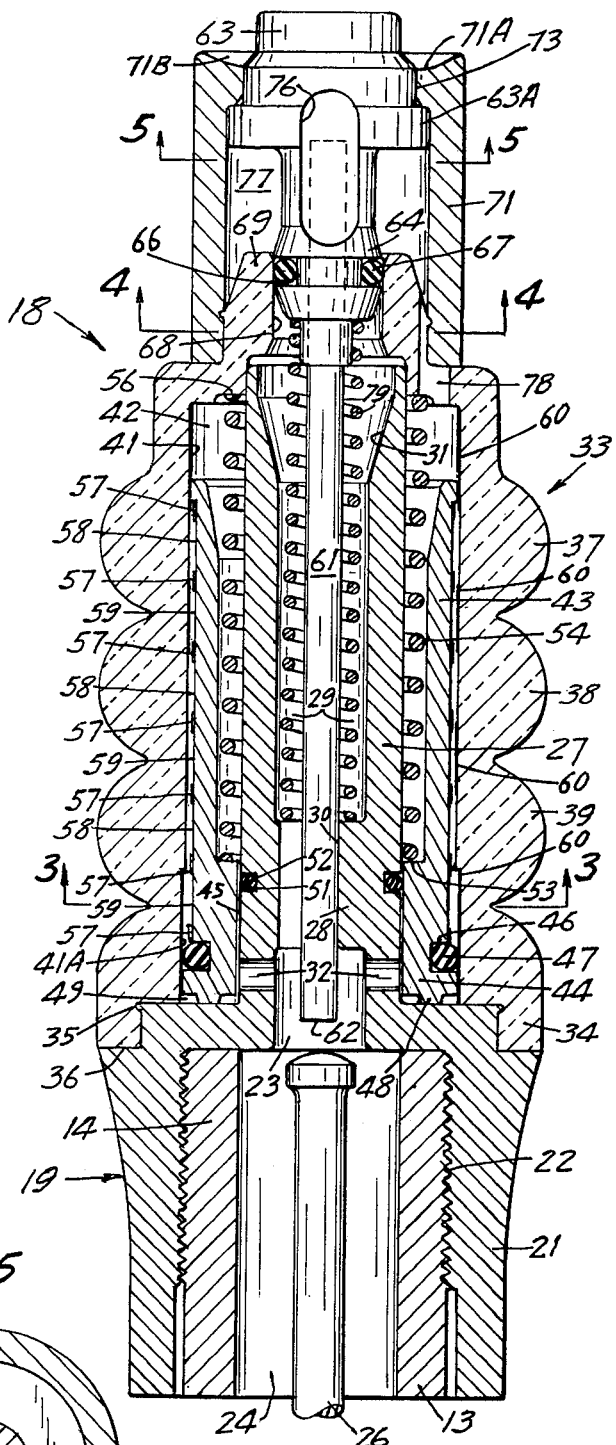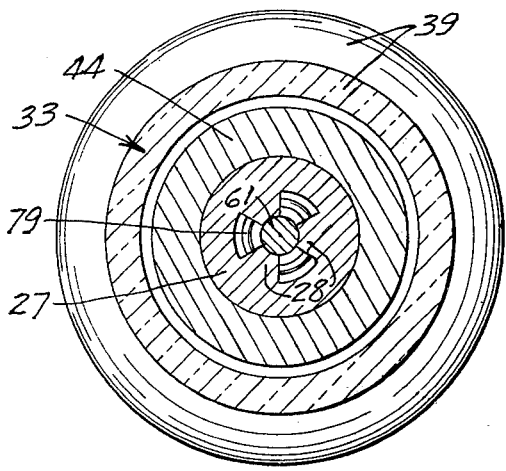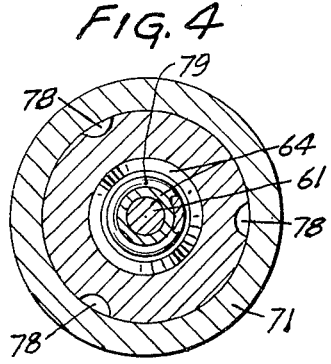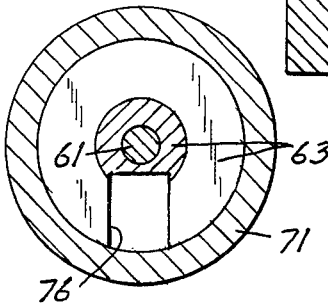

FLUID PRESSURE TESTING APPARATUS

CROSS REFERENCE TO RELATED APPLICATON

This application is a continuation-in-part of U.S. application Ser. No. 366,682 filed June 4, 1973, now U.S. Pat. No. 3,866,563.

BACKGROUND OF THE INVENTION

Richards in 1898 disclosed in U.S. Pat. No. 602,242 an air pressure indicator attached to the valve stem of a bicycle tire in a manner to indicate the pressure of the air in the tire. Numerous tire pressure indicators since Richards have been developed with the extensive use of pneumatic tires on vehicles. Examples of recent tire pressure indicators are described in U.S. Pats. Nos. 3,224,264; 3,536,026 and 3,719,198. These air pressure indicators are relatively complex in structure which leads to inaccurate or no readings. The air pressure apparatus of this invention obviates the disadvantages of the prior air testing devices for pneumatic tires.

SUMMARY OF THE INVENTION

The invention is broadly related to a fluid pressure testing apparatus or pressure indicating device for indicating whether the fluid pressure in a container is above or below a selected value. More particularly, the pressure testing apparatus is an air pressure testing apparatus for pneumatic tires as used on land and air vehicles, including but not limited to automobiles, trucks, recreational vehicles, bicycles, motorcycles, trailers, airplanes, tractors, and the like.

The testing apparatus has a body means which is mountable on the valve stem of a tire. The body means has a passage in communication with the passage of the valve stem. A transparent housing means surrounds the body means and forms with the body means an annular chamber. An annular piston means is located in the annular chamber. The piston means carries a first information means and a second information means which are selectively visible through the housing means, as determined by the position of the piston means in the chamber. The information means can be color codes. The piston means is biased with biasing means to a first position wherein the first information means is visually observable through the housing means. The piston will remain in this position until it is subjected to air pressure that is greater than the biasing force of the biasing means. A plunger extends through the passage in the body. The plunger is normally spaced from the air valve rod or valve core so that it does not interfere with the normal operation of the air valve in the valve stem. The plunger is movable to a position to engage the air valve rod and open the air valve whereby air under pressure from the tire acts on the annular piston. When the air pressure is greater than the biasing force of the spring, the annular piston will move to a second position wherein the second information means is visually observable through the transparent housing means. The change in the information means provides visual information that the air pressure in the tire is greater than the biasing force acting on the annular piston. The plunger is movable to a second position wherein air from an air hose can be introduced directly into the tire. The plunger makes contact with the air valve rod and opens the air valve wherein the air is free to flow through the passage and the valve stem into the tire. The pressure of the air in the tire can be checked with a conventional gauge. The gauge engages the head end of the plunger, moving the plunger to its full "in" position. This opens the passage in the body means and opens the air valve in the stem. The air pressure in the tire can be read on the pressure gauge.

An object of the invention is to provide an air pressure testing apparatus for a pneumatic tire that is normally in a passive condition wherein it does not interfere with the normal closing action of the air valve in a valve stem. A further object of the invention is to provide an air pressure testing apparatus which can be easily actuated to provide visual indication of whether the air pressure in a tire is above or below a predetermined value. Another object of the invention is to provide an air pressure testing apparatus that is self-cleaning in use. Yet another object of the invention is to provide an air pressure testing apparatus for a pneumatic tire that is integral with the valve stem for the tire. A further object of the invention is to provide an air pressure testing apparatus which is simple and sturdy in construction, attractive in appearance, easily installed on a conventional valve stem and reliable and safe in use.

IN THE DRAWINGS

FIG. 1 is a fragmentary sectional view through a vehicle wheel showing the air pressure tester of the invention on the valve stem of the pneumatic tire;

FIG. 2 is an enlarged sectional view taken along the line 2—2 of FIG. 1 showing the air pressure tester in the passive condition;

FIG. 3 is a sectional view taken along the line 3—3 of FIG. 2;

FIG. 4 is a sectional view taken along the line 4—4 of FIG. 2;

FIG. 5 is a sectional view taken along the line 5—5 of FIG. 2;

Figure 6:
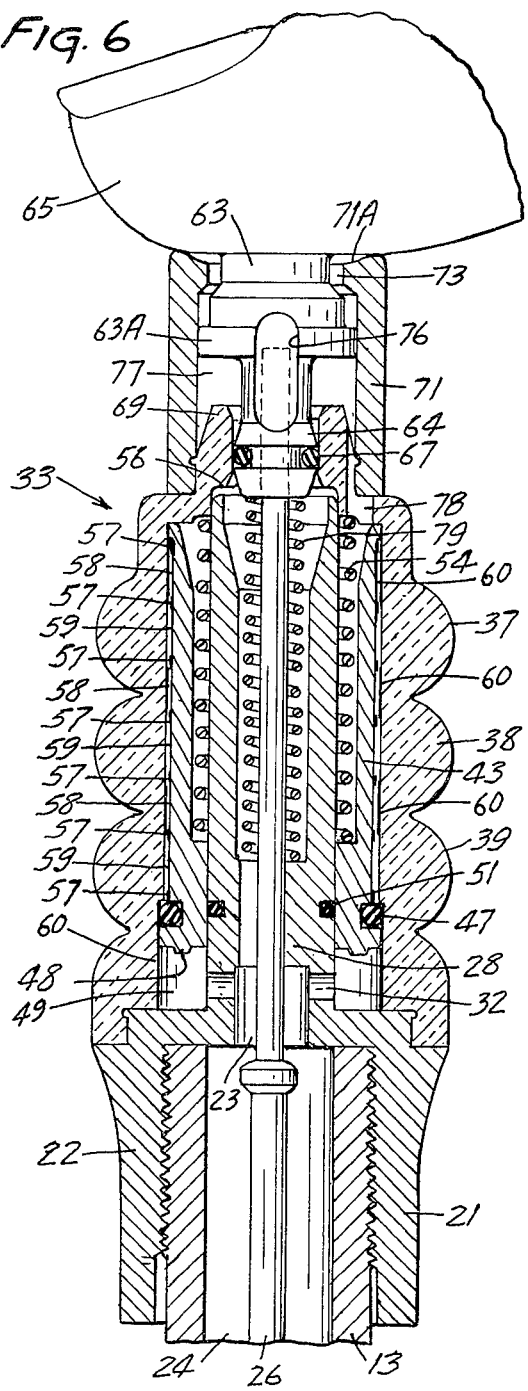
FIG. 6 is a sectional view of the air pressure tester similar to FIG. 5 showing the tester in the test condition.

Referring to the drawings, there is shown in FIG. 1 a vehicle wheel indicated generally at 10 as used on conventional automobiles, motor homes, trucks, trailers, tractors, and like vehicles. Other types of pneumatic tires, as used on bicycles, aircraft, industrial and agricultural machinery, can be equipped with the air pressure testing apparatus of the invention. Wheel 10 has a rim 11 carrying a pneumatic tire 12. Rim 11 has a hole accommodating a valve stem 13. Stem 13 has the conventional valving element to block the flow of air through the valve stem from the chamber 16 of the tire 12. Valve stem 13 extends through a hole in the wheel cover 17. Valve stem 13 projects outwardly at an upward angle as determined by the shape of rim 11. The shapes of different types of rims vary so that the angles of the valve stems vary. For example, the valve stem can project in a generally radially inward direction.

Mounted on the outer threaded end 14 of valve stem 13 is an air pressure testing apparatus of the invention indicated generally at 18. Pressure testing apparatus 18 is operable to provide visual information as to whether the air pressure in chamber 16 is above or below a selected pressure. Testing apparatus 18 also permits the introduction of air under pressure into chamber 16 through the valve stem 13 and the checking of the air pressure in chamber 16 with a conventional tire air pressure gauge.

Testing apparatus 18 is hereinafter described as a device to test air pressure in a pneumatic tire. The testing apparatus 18 can be used to test the pressure of other fluids stored in containers or vessels.

As shown in FIG. 2, testing apparatus 18 has a body indicated generally at 19 attached to the outer threaded end 14 of the valve stem 13. The body 19 has a cylindrical head 21. The inside wall of head 21 has threads 22 coacting with the threads on the threaded end 14 to mount the body 19 on the valve stem 13. The head 21 can be integral with valve stem 13. The apparatus 18 is mountable on the conventional valve stem without interfering with the normal closed position of the air valve in the valve stem. The center portion of head 21 has a central hole 23 in communication with the passage 24 of the valve stem 13. Conventional air valve rod or valve core stem 26 is located in passage 24 and is connected to the valving element or air valve (not shown). Valve rod 26 operates in the conventional manner in that when the rod 26 is depressed or moved into the passage 24, the air valve is opened thereby providing fluid communication to the interior or chamber 16 of the tire 12.

Body 19 has an elongated tubular trunk 27 integral with the head 21 and extended in a longitudinal direction outwardly away from head 21. As shown in FIGS. 2 and 3, trunk 27 has a plurality of inwardly directed legs 28. The ends of the legs 28 are spaced from each other to provide an opening 30 in axial alignment with the valve rod 26. The legs 28 are circumferentially spaced from each other to provide a passage 29 in communication with the center hole 23. Passage 29 extends axially through the trunk 27.

The upper or outer end of trunk 27 has an outwardly tapered recess 31 which increases the size of the passage 29. The opposite end of trunk 27 has transverse or lateral ports or outlet passages 32 which permit the flow of air externally of the trunk 27.

A sleeve-like housing indicated generally at 33 is concentrically disposed about the trunk 27. Housing 33 has an annular flange 34 disposed in an annular step shoulder 36 in the base portion of head 21. The flange 34 and head 21 have cooperating groove and rib means 35 which fix the housing 33 on the head 21. Suitable adhesives or bonding materials can be used to attach the housing 33 to head 21. The housing 33 has three circumferential transparent beads 37, 38 and 39. Each bead has an annular shape and a semi-circular longitudinal sectional configuration and functions as a lens structure which focuses the light in an inward direction. The transparent beads 37, 38 and 39 function as an optical system to enlarge the visual image of the air pressure information indicia within housing 33. The housing 33 has an inside cylindrical wall 41 spaced from the trunk 27 thereby provding an annular chamber 42. Housing 33 is made of a transparent material, as a transparent plastic, glass, or the like.

An elongated annular piston or sleeve member 43 is movably disposed in chamber 42. Piston 43 has a base portion 44. An annular groove 46 is disposed in the bottom of the outside wall of base 44. An O-ring 47 is located in groove 46 and in engagement with a portion 41A of the inside wall 41. Air under pressure in groove 46 moves the O-ring 47 in sealing engagement with base portion 44 and wall 41A. The base 44 has axially extended projections or feet 48 in engagement with the bottom of head 21. The feet 48 are circumferentially spaced from each other to provide passages 49 in communication with the outlet passages 32. The inside wall 45 of base 44 is in engagement with a second O-ring 51. O-ring 51 is disposed in an annular groove 52 located in the trunk 27. The O-rings 47 and 51 provide seals internally and externally of the annular piston 43 whereby air under pressure from tire 12 acts on the piston 43 to move the piston 43 longitudinally away from head 21.

Piston 43 is biased into engagement with head 21 with a calibrated compression spring 54. Spring 54 is calibrated in accordance with the air pressure level which is to be tested in the tire. One end of spring 54 engages an annular shoulder or step 53 on the base 44. The opposite end of the spring 54 is disposed in an annular recess 56 in the outer end of housing 33.

A plurality of longitudinally spaced circumferential black lines 57 are mounted on the outer circumference of the piston 43. Lines 57 divide the outside wall of the piston into a plurality of circumferential information segments or bands 58 and 59. The segments 58 are color coded red and are in transverse alignment with the diametrical axes of the beads 37, 38 and 39 when the piston 43 is in engagement with the head 21, as shown in FIG. 2. When the piston 43 is in this position, the testing apparatus 18 will provide a red visual indication. The segments or bands 59 are color coded green and are located between red segments 58. The color green is not visible when the piston 43 is in engagement with the head 21 because of the lens structure of the beads 37, 38 and 39. The bands 58 and 59 are color coded red and green, respectively. Other color code combinations and other information indicia, as numbers, marks, grooves, braille, and the like, can be used to identify the bands.

The inside wall 41 of housing 33 has a plurality of cylindrical strips or masks 60 of opaque material, as black ink or paint. Strips 60 are located adjacent bands 59 and the opposite ends of piston 43 and are longitudinally separated from each other providing annular transparent sections aligned with bands 58 whereby the color information of bands 58 is visible and the color information of bands 59 is masked or covered.

A linear plunger 61 extends longitudinally through the passage 29 of the trunk 27. The plunger 61 slideably projects through opening 30 and has a forward end 62 located in the center hole 23. End 62 is normally spaced from air valve rod 26. The opposite or rear end of plunger 61 has a head 63 which serves as an actuator button for the pressure testing apparatus. An annular collar 64 is mounted on the plunger 61 adjacent the head 63. Collar 64 has an annular groove 66 accommodating an O-ring 67. O-ring 67 is in sealing engagement with the cylindrical inside wall 68 of the nipple or projection 69 on the outer end of housing 33. The collar 64 and O-ring 67 function as a seal to close the opening from the inside of housing 33 and passage 29.

A cylindrical cap 71 is located about the head 63. The cap 71 is mounted on the nipple 69 and has a groove 72 accommodating a rib or projection to fix the position of the cap on the nipple. Other types of fastening or holding structure can be used to mount the cap on the nipple. The cap 71 has a center hole or opening 73 for a portion of the head 63. The head 63 has an outwardly directed annular flange or chin 63A which engages short annular and inwardly directed portion 71A of the head 63 surrounding opening 73 to limit outward movement of the head relative to the cap 71. The top part of cap portion 71A has an inwardly inclined wall 71B to accommodate a conventional air chuck used to introduce air into the tire via the testing apparatus. The flange 63A has a longitudinal groove or opening 76 providing a passage from the chamber 77 within cap 71 to the atmosphere. Housing 33 has three passages 78 providing fluid communication between chamber 77 and the chamber 42 of housing 33. Thus the air in the chamber 42 is vented to the atmosphere via passages 78 and opening 76.

The plunger 61 is biased in an outward direction with a compression spring 79. Spring 79 is concentrically positioned about plunger 61. One end of spring 79 engages the legs 28 of trunk 27. The outer end of spring 79 engages the base of collar 64.

Figure 8:
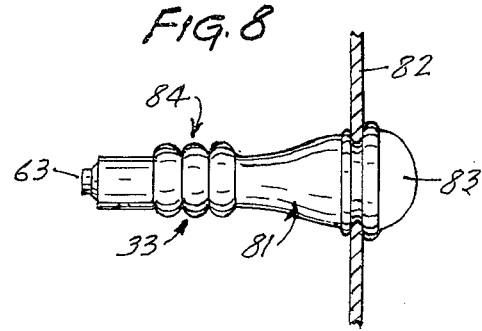
FIG. 8 is a modification of the air pressure tester of the invention mounted on the rim of a vehicle wheel.

Referring to FIG. 8, there is shown a modification of the fluid pressure testing apparatus of the invention integral with a valve stem 81. Stem 81 is mounted on the rim 82 of a tire as a pneumatic tire of a motor vehicle or the like. Valve stem 81 has a base 83 cooperating with the rim 82 to mount the stem on the rim. The outer end of valve stem 81 has air pressure testing apparatus indicated generally at 84. Testing apparatus 84 is identical in structure with the testing apparatus 18 as shown in FIG. 2. The body of apparatus 84 is integral with the valve stem 81.

In use, the pressure testing apparatus 18 as shown in FIG. 2 is in the passive condition. The valving element in the valve stem 13 functions to prevent the escape of air from the chamber 16 of the tire. The testing apparatus 18 does not interfere with the normal operation of the air valve. The annular piston 43 is biased with spring 54 into engagement with the base of the head 21. This locates the red segments or bands 58 in alignment with a transverse plane passing through the mid-portion of the beads 37, 38 and 39. The annular convex shape of the beads 37, 38 and 39 focus the light on the red bands 58 whereby a red visual indication is expressed by the testing apparatus.

Referring to FIG. 6, the testing apparatus 18 is shown in the test condition. Pressure, such as the pressure of a finger 65 on the head 63 moves the head and plunger 61 from its passive or first position in an inward direction. Head 63 is moved into cap 71 until finger 65 contacts the top cap portion 71A. Portion 71A serves as a stop determining the test or second position of the plunger 61. The end 62 engages the air valve rod 26 moving the air valve rod 26 in an inward or open position opening the air valve. The air under pressure in the tire chamber 16 flows through the valve stem 13 into the passage 29. The collar 64 and O-ring 67 confine the air to the passage 29. The air flows through lateral ports 32 under the piston 43. If the pressure of the air is above a predetermined value as determined by the compression characteristics of spring 54, the piston 43 will move in an upward or outward direction and engage the top of housing 33. This moves the green bands 59 into registration with the transverse planes and longitudinal alignment with the beads 37, 38 and 39. The testing apparatus 18 will now visually indicate a green color providing information that the pressure in the tire is equal to or above a predetermined pressure. This pressure is dependent upon the compression characteristics of the calibrated spring 54. The calibration number of the spring 54 is identified directly on the cap 71.

When piston 43 moves from its first or passive position, shown in FIG. 1, to the test or second position, shown in FIG. 2, the air above the piston is forced through openings 78 into chamber 77. Air in chamber 77 flows past head 64 carrying any foreign particles, as dirt, snow, and the like, to the atmosphere. Thus, every time the head 63 is depressed and the piston 43 moves to the test position, the apparatus is self-cleaned or purged with escaping air.

When the actuating pressure on head 63 has been released, the spring 79 will bias the head back into its initial position as shown in FIG. 2. This will move the end 62 of the plunger 61 away from the valve rod 26 whereby the air valve will close cutting off the pressure of the air to the testing apparatus. The air pressure in the passage 29 is reduced due to the increase in volume of passage 79. As soon as the pressure is below a predetermined value, the spring 54 will bias the piston 43 back to its initial position as shown in FIG. 2. This places the red bands in transverse registration with the beads 37, 38 and 39. The indicator will now read its red condition.

Figure 7:
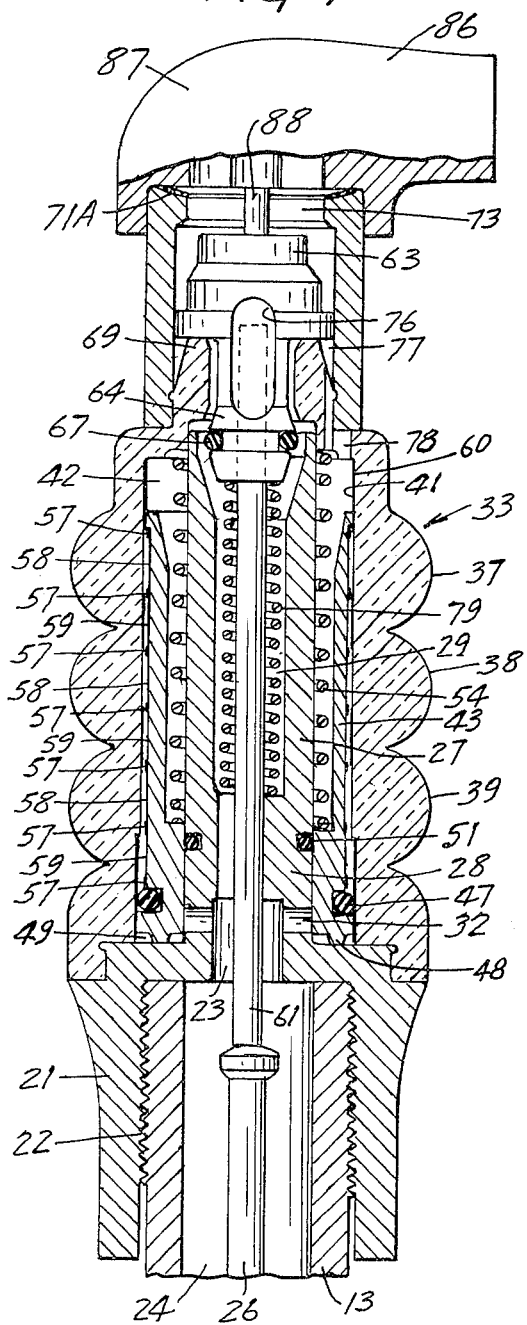
FIG. 7 is a sectional view of the air pressure tester similar to FIG. 2 showing the tester in the air fill condition.

Referring to FIG. 7, the pressure testing apparatus 18 is shown in the "fill" position. Air under pressure from a conventional hose indicated at 86 is placed over the outer end of cap 71. The hose coupler or chuck 87 has a central finger 88 which engages the head 63. The finger moves the head 63 into the chamber 77. The collar 64 and O-ring 67 will be moved into the enlarged area of the trunk 27. This moves the O-ring 67 out of sealing engagement with the cylindrical wall 68. The air is free to flow through the passage of the nipple 69 into the passage 29. The passage 29 leads to the center hole 23 in communication with the valve passage 24. The plunger 61 will move the air valve rod 26 to its "in" or open position whereby the air from the hose 86 can flow through the testing apparatus 18 into the chamber 16 of tire 12.

A conventional tire pressure gauge can be used to check the pressure of the tire. The gauge functions in the same manner as hose 86 to move the plunger to its full "in" position whereby the pressure of the tire flows through the pressure testing apparatus 18 to provide the indication of the tire pressure on the gauge. Upon removal of the gauge from the head 63, the spring 79 will bias the plunger 61 to its passive position, as shown in FIG. 2. The air valve rod 26 will return to its closed position thereby confining the air to the chamber 16 of tire 12.

Figure 9:
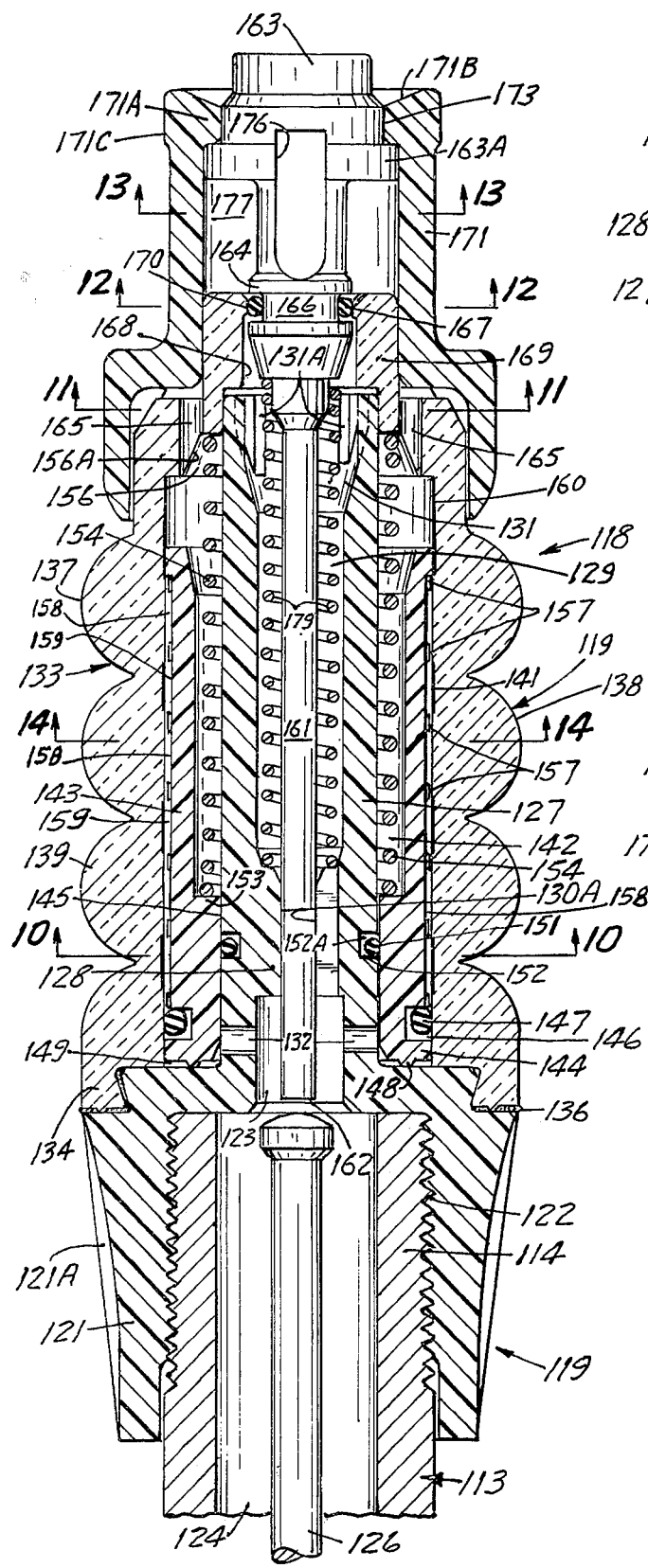
FIG. 9 is an enlarged sectional view of a modification of the fluid pressure testing apparatus of the invention similar to FIG. 2 showing the apparatus in the passive condition.

Referring to FIG. 9, there is shown a modification of the fluid pressure testing apparatus of the invention, indicated generally at 118, mounted on the outer threaded end 114 of a conventional valve stem 113. The pressure testing apparatus 118 is operable to provide visual information as to whether the fluid pressure subjected to the valve stem is above or below a selected value. The testing apparatus 118 allows for the introduction of fluid into or through the valve stem into a chamber and the checking of the air pressure in the chamber with a conventional fluid pressure gauge. The valve stem 113 can be the conventional valve stem of a pneumatic tire, as shown in FIG. 1. The testing apparatus 118 is hereinafter described to test the air pressure in a pneumatic tire.

Testing aparatus 118 has a body, indicated generally at 119, attached to the outer threaded end 114 of the valve stem 113. Body 119 has a cylindrical head 121 provided with a plurality of circumferentially spaced outwardly directed ribs or flanges 121A. The inside wall of head 121 has threads 122 cooperating with the threaded end 114 to mount the body 119 on the valve stem 113. The center portion of head 121 has a central hole 123 in communication with the passage 124 of valve stem 113. A conventional air valve rod or valve core 126 is located in passage 124 and is connected to a valving element or air valve (not shown). Rod 126 operates in the conventional manner in that when the rod is depressed or moved in the passage 124, the air valve is open thereby providing fluid communication from the chamber to the passage 124.

Figure 10:
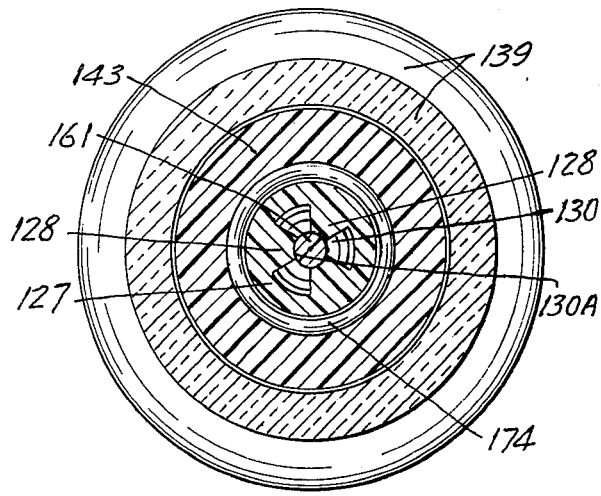
FIG. 10 is a sectional view taken along the line 10—10 of FIG. 9.
Figure 11:
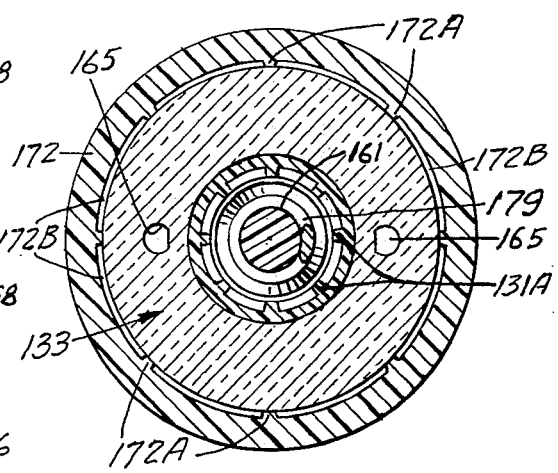
FIG. 11 is a sectional view taken along the line 11—11 of FIG. 9.

Body 119 has an elongated tubular trunk 127 integral with head 121. Trunk 127 is extended in a longitudinal direction outwardly away from head 121. As shown in FIGS. 9 and 10, trunk 127 has a plurality of inwardly directed legs 128 circumferentially spaced from each other to provide passages 130 to restrict the movement of air flowing through the main passage 129 extended through the trunk 127. The legs 128 define a central hole 130A for accommodating a portion of the actuating plunger 161. The upper or outer end of trunk 127 has an outwardly directed cone-shaped recess 131. A plurality of inwardly directed ribs 131A project inwardly into the upper end of passage 129. Ribs 131A, as shown in FIG. 11, function as stops to retain the plunger O-ring 167 in operative relation with the plunger 161.

The lower end of trunk 127 has a plurality of laterally directed outlet ports 132 and annular chamber 149 surrounding the trunk 127. The annular chamber 149 is defined by trunk 127 and a cylindrical housing, indicated generally at 133, mounted on the body 119. Housing 133 has an annular flange 134 secured to the top of body 119 with a sealant 136.

Housing 133 has three circumferential transparent beads 137, 138 and 139. Each bead has an annular shape and a semi-circular longitudinal sectional configuration. The beads function as an optical lens structure which focuses the light in an inward direction. The beads from an optical system to enlarge the visual image of the air pressure information indicia within housing 133. Housing 133 has an inside cylindrical wall 141 spaced from the outside wall of trunk 127 to provide the annular chamber 142. Piston 143 has a base portion 144 having a number of spaced legs 148 engaging the top of head 121. An annular groove 146 is disposed in the bottom of the outside wall of base 144. An O-ring 147 is located in groove 146 and in engagement with a portion of the inside wall 141 of the housing 133.

The inside wall 145 of base 144 is in engagement with a second O-ring 151. O-ring 151 is located in an annular groove 152 surrounding the trunk 127. Groove 152 is wider and deeper than the diameter of the O-ring 151. The inside section of O-ring 151 is spaced from the bottom of groove 152 with a small annular space 152A. In use, when air under pressure is placed in the bottom of chamber 149, the O-rings 147 and 151 will deform to provide a seal between the external and internal portions of annular piston 143 and the housing 133 and trunk 127. The O-rings 147 and 151 are of a resilient material as rubber such that they will deform or flatten when subjected to air under pressure. The annular piston 143 will initially move so that the O-rings 147 and 151 do not freeze or prevent the initial movement of the annular piston 143. The lateral and longitudinal spaces of the grooves and the O-rings respectively allow for the free initial movement of the annular piston 143.

Piston 143 is biased into engagement with the head 121 with a biasing means as a calibrated compression spring 154. The spring 154 has a compression strength in accordance with the air pressure level which is to be tested, for example, 24 psi, 26 psi, 28 psi, 32 psi, and the like. The inner end of spring 154 engages an annular shoulder 153 on base 144. The outer end of spring 154 is located in an annular recess 156 at the upper end of chamber 142. Recess 156 has a tapered annular wall 156A to center the spring 154 about the trunk 127.

A plurality of longitudinally spaced circumferential black lines 57 are mounted on the outer circumference of the piston 143. Lins 157 divide the outside wall of the piston into a plurality of circumferential information segments or bands 158 and 159. The segments 158 are color coded red and are in transverse alignment with the diametrical axes of the beads 137, 138 and 139 when the piston 143 is in engagement with the head 121, as shown in FIG. 9. When the piston 143 is in this position, the testing apparatus 118 will provide a red visual indication. The segments or bands 159 are color coded green and are located between the red segments 158. The color green is not visible when the piston 143 is in engagement with the head 121 because of the lens structure of the beads 137, 138 and 139. The bands 158 and 159 are color coded red and green, respectively. Other color code combinations and other information indicia, as numbers, marks, grooves, braille, and the like, can be used to identify the bands.

The inside wall 141 of housing 133 has a plurality of cylindrical strips or masks 160 of opaque material, as black ink or paint. Strips 160 are located adjacent bands 159 and the opposite ends of piston 143 and are longitudinally separated from each other providing annular transparent sections aligned with bands 158 whereby the color information of bands 158 is visible and the color information of bands 159 is masked or covered. The inside wall 141 of housing 133 may be continuous without masking strips 160. The optical arrangement of the beads 137, 138 and 139 function to make only one color visible.

A linear plunger 161 extends longitudinally through the passage 129 of the trunk 127. The plunger 161 slideably projects through opening 130A and has a forward end 162 located in the center hole 123. End 162 is normally spaced from air valve rod 126. The opposite or rear end of plunger 161 has a head 163 which serves as an actuator button for the pressure testing apparatus. An annular collar 164 is mounted on the plunger 161 adjacent the head 163. Collar 164 has an annular groove 166 accommodating an O-ring 167. O-ring 167 is in engagement with the cylindrical inside wall 168 of the nipple or projection 169 on the outer end of housing 133. The collar 164 and O-ring 167 function as a seal to close the opening from the inside of housing 133 and passage 129 after the head 163 has been initially depressed.

Figure 12:
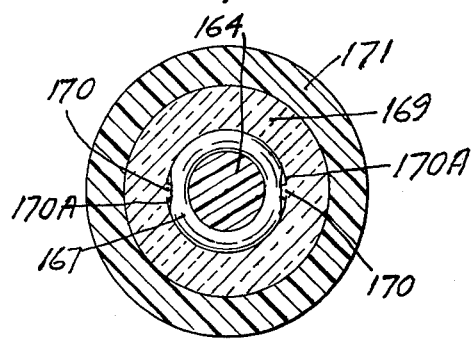
FIG. 12 is a sectional view taken along the line 12—12 of FIG. 9.
Figure 13:
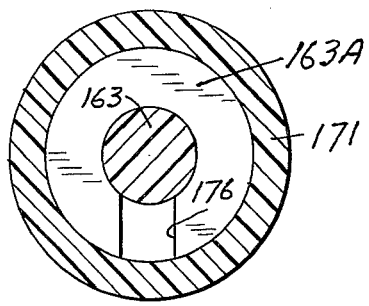
FIG. 13 is a sectional view taken along the line 13—13 of FIG. 9.
Figure 14:
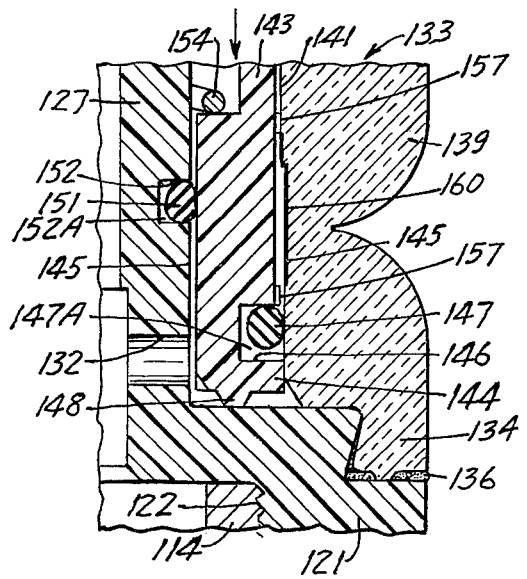
FIG. 14 is an enlarged sectional view of the seal structure for the annular piston of the fluid pressure testing apparatus.

As shown in FIGS. 9 and 12, nipple 169 has a pair of inwardly directed vertical ribs 170 engageable with O-ring 167 when the plunger is in the passive or non-operative position. The ribs 170 have a length about equal to the diameter of O-ring 167 and a thickness of about one-half the diameter or less of O-ring 167. The ribs 170 deform the O-ring 167 and provide small leakage passages 170A for air to escape from passage 129. This ensures that the piston 143 will quickly return to the passive position when the external pressure on head 163 is released.

A cylindrical cap 171 is located about the head 163. The cap 171 is mounted on the nipple 169 and has an annular flange 172 to fix the position of the cap 171 on the nipple 169. As shown in FIG. 11, flange 172 is spaced with a plurality of inside ribs 172A from the top and sides of the outer end of housing 133 to provide an air bleed passage 172B for air from the upper end of chamber 142. The upper end of housing 133 has a number of holes 165 open to passage 172B and the top of chamber 142 so that when the sleeve 143 moves up the air in chamber 142 can escape to atmosphere. Cap 171 has a center hole or opening 173 for a portion of the head 163. Head 163 has an outwardly directed annular flange or chin 163A which engages short annular and inwardly directed portion 171A of the head 163 surrounding opening 173 to limit outward movement of the head relative to the cap 171. The top part of cap portion 171A has an inwardly inclined wall 171B to accommodate a conventional air chuck used to introduce air into the tire via the testing apparatus. Flange 163A has a longitudinal groove or opening 176 providing a passage from the chamber 177 within cap 171 to the atmosphere. Cap 171 on outer annular peripheral rib 171C provides engaging and holding structure for an air chuck clamp.

Figure 15:
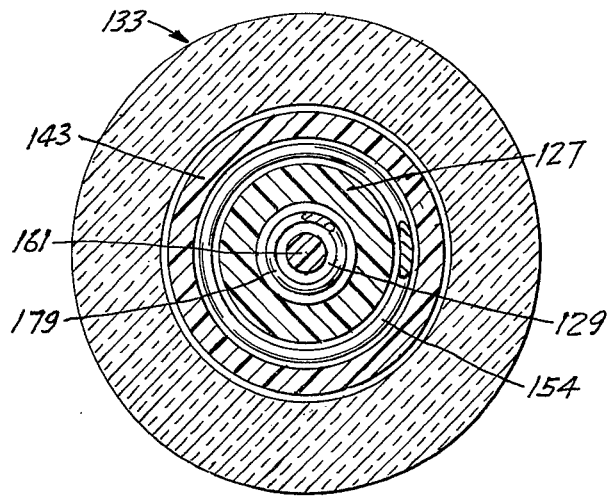
FIG. 15 is a sectional view taken along line 15—15 of FIG. 9.

Plunger 161 is biased in an outward direction with a compression spring 179. As shown in FIG. 15, spring 179 is concentrically positioned about plunger 162. One end of spring 179 engages the legs 128 of trunk 127. The outer end of spring 179 engages the base of collar 164.

In use, the pressure testing apparatus 118 as shown in FIG. 9 is in the passive condition. The valving element in the valve stem 113 functions to prevent the escape of air from the chamber of the tire. The testing apparatus 118 does not interfere with the normal operation of the air valve. The annular piston 143 is biased with spring 154 into engagement with the base of the head 121. This locates the red segments or bands 158 in alignment with a transverse plane passing through the mid-portion of the beads 137, 138 and 139. The annular convex shape of the beads 137, 138 and 139 focus the light on the red bands 158 whereby a red visual indication is expressed by the testing apparatus.

The testing of the air pressure is done by applying an external force, such as the pressure of a finger, on the head 163 to move the head 163 and plunger 161 from its passive or first position in an inward direction. Head 163 is moved into cap 171 until the finger contacts the top cap portion 171A. Portion 171A serves as a stop determining the test or second position of the plunger 161. The end 162 engages the air valve rod 126 moving the air valve rod 126 in an inward or open position opening the air valve. The air under pressure in the tire chamber flows through the valve stem 113 into the passage 129. The collar 164 and O-ring 167 confine the air to the passage 129. O-ring 167 moves into sealing engagement with wall 168. The air flows through lateral ports 132 under the piston 143. If the pressure of the air is above a predetermined value as determined by the compression characteristics of spring 154, the piston 143 will move in an upward or outward direction and engage the top of housing 133. The air above piston 143 flows to atmosphere via holes 165 and passage 172B. This moves the green bands 159 into registration with the transverse planes and longitudinal alignment with the beads 137, 138 and 139. The testing apparatus 118 will now visually indicate a green color providing information that the pressure in the tire is equal to or above a predetermined pressure. This pressure is dependent upon the compression characteristics of the calibrated spring 154. The calibration number of the spring 154 is identified directly on the cap 171. For example, a psi number can be carried on cap 171.

When the actuating force on head 163 has been released, spring 179 will bias the head 163 back into its initial position as shown in FIG. 9. This will move the end 162 of the plunger 161 away from the valve rod 126 whereby the air valve will close cutting off the pressure of the air to the testing apparatus. The air in passage 129 escapes to atmosphere via bleed passages 170A past O-ring 167, chamber 177 and past head 163. As soon as the pressure is below a predetermined value, spring 154 will bias the piston 143 back to its initial position as shown in FIG. 9. This places the red bands in transverse registration with the beads 137, 138 and 139. The indicator will now read its red condition.

The pressure testing apparatus 118 has a "fill" position similar to the apparatus shown in FIG. 7. Air under pressure from a conventional hose is placed over the outer end of cap 171. The hose coupler or chuck has a central finger which engages the head 163. The finger moves the head 163 into the chamber 177. The collar 164 and O-ring 167 will be moved into the enlarged area of the trunk 127 adjacent ribs 131A. This moves the O-ring 167 out of sealing engagement with the cylindrical wall 168. The air is free to flow through the passage of the nipple 169 into the passage 129. Passage 129 leads to the center hole 123 in communication with the valve passage 124. The plunger 161 will move the air valve rod 126 to its "in" or open position whereby the air from the hose can flow through the testing apparatus 118 into the chamber of a tire. Passages 130 restrict the flow of air into the passage 124 so that the pressure of the air is about the same as the pressure of the air in the tire chamber. Since lateral ports 132 below passages 130, air under pressure about the same as tire chamber air pressure acts on piston 143. The piston 143 will move to its up position when the proper amount of air pressure is in the tire chamber. When extremely high air pressure is applied to the cap 171, the passages 130 do not provide for sufficient restriction to reduce the air pressure at ports 132 to the level of the pressure of the tire chamber.

Figure 16:
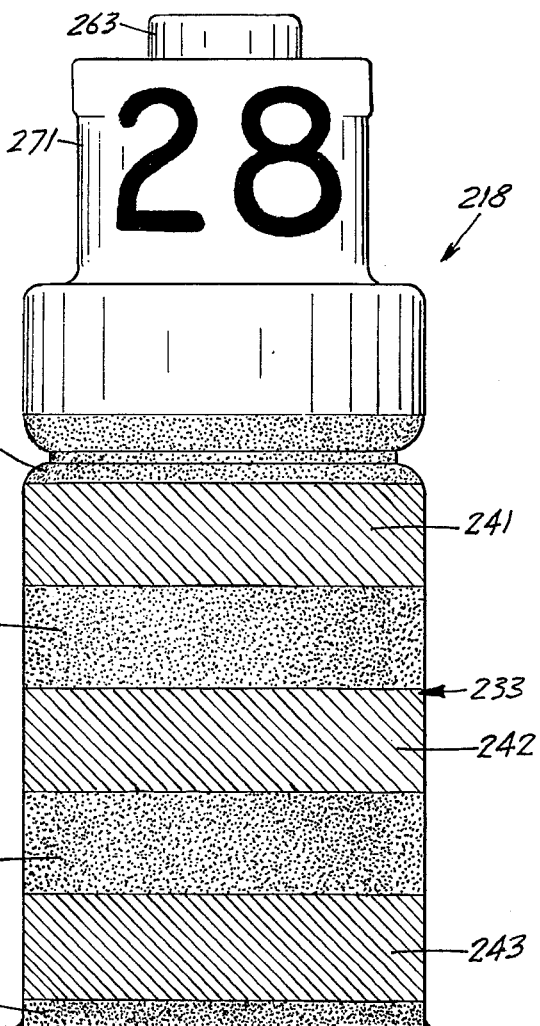
FIG. 16 is a side elevational view of another modification of the fluid pressure testing apparatus of the invention.

Referring to FIG. 16, there is shown another modification of the testing apparatus indicated generally at 218. Apparatus 218 has a body 219 similar to body 119 adapted to be mounted on a valve stem of a pneumatic tire. A cylindrical housing 233 is mounted on body 219. A cap 271 is attached to the outer end of housing 233. An actuator button 263 is movably mounted on the outer end of cap 271.

Housing 233 is a transparent plastic member carrying mating non-transparent bands 234, 236, 237 and 238. The bands are longitudinally spaced from each other providing the housing with three circular windows or viewing areas 241, 242 and 243. The internal structure and operation of apparatus 218 is the same as the apparatus shown in FIGS. 9 to 15 and the description thereof.

While there have been shown and described preferred embodiments of the invention, it is understood that various changes, substitutions of parts and materials may be made by those skilled in the art without departing from the spirit of the invention. For example, all the parts except the springs can be made of plastic materials.

The embodiments of the invention in which an exclusive property or privilege is claimed are defined as follows:

1. A fluid pressure testing apparatus for indicating the pressure of a fluid in a container having a normally closed valve connected to the container comprising: body means having a passage in communication with the valve, housing means mounted on the body means, said housing means having a viewing section, said body means and housing means defining a chamber, piston means located in said chamber, first information means on one portion of the piston means and second information means on another portion of the piston means, biasing means yieldably holding the piston means in a first position wherein said first information means is visually observable through the viewing section, plunger means extended through said passage of the body means, said plunger means having a portion located outside of the housing means that is manually engaged to move the plunger means from a first position to a second position to open the valve whereby fluid under pressure from the container exerts a force on the piston means, when said force on the piston means is greater than the force of the biasing means that piston means moves to a second position wherein said second information means is visually observable through the viewing section.

2. The apparatus of claim 1 wherein: the body means has a head portion adapted to connect to said valve and a trunk portion, said passage extended longitudinally through said trunk portion.

3. The apparatus of claim 2 including: second biasing means for biasing said plunger means away from said valve toward the first position.

4. The apparatus of claim 1 wherein: the body means is integral with said valve.

5. The apparatus of claim 1 wherein: said viewing section is a transparent section having at least one annular outwardly directed bead.

6. The apparatus of claim 5 wherein: each bead has a semi-circular longitudinal sectional shape.

7. The apparatus of claim 1 wherein: said passage is open to the atmosphere, and seal means cooperating with the plunger means and housing means to seal said passage when the plunger means is in the second position.

8. The apparatus of claim 1 wherein: said viewing section of the housing means is a transparent section having a plurality of annular outwardly directed beads, said first information means being a colored band aligned with said beads when the piston means is in the first position, and said second information means being a colored band aligned with said beads when the piston is in the second position.

9. The apparatus of claim 1 wherein: said plunger means includes an elongated rod extending through said passage and a head at the outer end of said rod.

10. The apparatus of claim 9 including: cap means mounted on said housing means and engageable with said head means to hold the plunger means in assembled relation with the housing means.

11. The apparatus of claim 1 wherein: said plunger means includes a head, and cap means mounted on the housing defining a chamber having an opening to the atmosphere, said head engageable with said cap means to close said opening when the plunger means is in the first position.

12. The apparatus of claim 1 wherein: said viewing section comprises transparent cylindrical portions separated with non-transparent cylindrical bands.

13. The apparatus of claim 1 including: means in the passage in the body to restrict the flow of fluid through said passage in the body.

14. A fluid pressure testing apparatus for indicating the pressure of a fluid in a container having a normally closed valve connected to the container comprising: body means having a passage in communication with the valve, housing means mounted on the body means, said housing means having a viewing section, said body means and housing means defining a chamber, piston means located in said chamber, first information on one portion of the piston means and second information means on another portion of the piston means, biasing means yieldably holding the piston means in a first position wherein said first information means is visually observable through the viewing section, plunger means extended through said passage of the body means, said plunger means movable from a first position to a second position to open the valve whereby fluid under pressure from the container exerts a force on the piston means, when said force on the piston means is greater than the force of the biasing means the piston means moves to a second position wherein said second information means is visually observable through the viewing section, said housing means surrounding said body means and having a wall spaced from the body means to define an annular chamber, said piston means being an annular sleeve located in the annular chamber and passage means connecting the annular chamber with the passage in the body means.

15. The apparatus of claim 14 wherein: said first and second information means are separate circumferential color bands mounted on outside portions of the sleeve.

16. The apparatus of claim 14 including: a first seal between the wall and the annular sleeve, and a second seal between the annular sleeve and body means.

17. The apparatus of claim 16 wherein: each seal is an O-ring located in a groove, said groove being larger than the diameter of the O-ring and smaller in diameter than the inside diameter of the O-ring whereby the O-ring has limited movement in the groove.

18. A fluid pressure testing apparatus for indicating the pressure of a fluid in a container having a normally closed valve connected to the container comprsing: body means having a passage in communication with the valve, housing means mounted on the body means, said housing means having a viewing section, said body means and housing means defining a chamber, piston means located in said chamber, first information means on one portion of the piston means and second information means on another portion of the piston means, biasing means yieldably holding the piston means in a first position wherein said first information means is visually observable through the viewing section, plunger means extended through said passage of the body means, said plunger means movable from a first position to a second position to open the valve whereby fluid under pressure from the container exerts a force on the piston means, when said force on the piston means is greater than the force of the biasing means the piston means moves to a second position wherein said second information means is visually observable through the viewing section, said plunger means being movable from the second position to a third position wherein fluid under pressure from an outside source can be introduced through the apparatus into the container or exhausted through the apparatus to the atmosphere.

19. The apparatus of claim 18 including: means to bleed air past the seal means when the plunger means is in the first position.

20. A fluid pressure testing apparatus for indicating the pressure of a fluid in a container having a normally closed valve connected to the container comprising: body means having a passage in communication with the valve, housing means mounted on the body means, said housing means having a viewing section, said body means and housing means defining a chamber, piston means located in said chamber, first information means on one portion of the piston means and second information means on another portion of the piston means, biasing means yieldably holding the piston means at a first position wherein said first information means is visually observable through the viewing section, plunger means extended through said passage of the body means, said plunger means movable from a first position to a second position to open the valve whereby fluid under pressure from the container exerts a force on the piston means, when said force on the piston means is greater than the force of the biasing means, the piston means moves to a second position wherein said second information means is visually observable through the viewing section, said passage being open to the atmosphere, and seal means cooperating with the plunger means and housing means to seal said passage when the plunger means is in the second position and open said passage when the plunger means is moved to a third position.

21. A fluid pressure testing apparatus for indicating the pressure of a fluid in a container having a normally closed valve connected to the container comprising: body means having a passage in communication with the valve, housing means mounted on the body means, said housing means having a viewing section, said body means and housing means defining a chamber, piston means located in said chamber, first information on one portion of the piston means and second information means on another portion of the piston means, biasing means yieldably holding the piston means in a first position wherein said first information means is visually observable through the viewing section, plunger means extended through said passage of the body means, said plunger means movable from a first position to a second position to open the valve whereby fluid under pressure from the container exerts a force on the piston means, when said force on the piston means is greater than the force of the biasing means the piston means moves to a second position wherein said second information means is visually observable through the viewing section, said passage being open to the atmosphere, seal means cooperating with the plunger means to seal said passage when the plunger means is in the second position and open said passage when the plunger means is moved to a third position, and means for holding the seal means in cooperating relation with the plunger means when the plunger means is in the third position.

22. The apparatus of claim 21 wherein: the plunger means has a collar having a groove, said seal means being an O-ring located in said groove, said means for holding the seal means including ribs on the body means to prevent the O-ring from moving out of the groove.

23. An air pressure testing apparatus for indicating air pressure in a pneumatic tire or the like having a valve stem with a normally closed air valve, comprising: body means connected to the valve stem, said body means having a passage in communication with the air valve and an outside annular wall, housing means surrounding the body means, said housing means having an inside annular wall spaced from the annular wall of the body means forming an annular chamber and a transparent section, annular piston means located in said annular chamber, passage means connecting the chamber with the passage in the body means, first color means on first portions of the piston means, biasing means yieldably holding the piston means in a first position wherein said first color means is visually observable through the transparent section, plunger means extended through said passage of the body means and normally spaced from the air valve, said plunger means movable from a first position to a second position to engage the air valve to open the air valve whereby air under pressure from the tire exerts a force on the annular piston means, when said force on the piston means is greater than the force of the biasing means, the piston means moves to a second position wherein said second color means is visually observable through the transparent section.

24. The apparatus of claim 23 wherein: the body means has a head portion adapted to connect to said valve stem.

25. The apparatus of claim 23 wherein: the body means is integral with the valve stem.

26. The apparatus of claim 23 including: second biasing means for biasing said plunger means away from said valve.

27. The apparatus of claim 23 wherein: said transparent section of the housing means has a plurality of annular outwardly directed beads.

28. The apparatus of claim 27 wherein: each bead has a semi-circular longitudinal sectional shape.

29. The apparatus of claim 23 wherein: said seal means cooperates with the plunger means to open said passage when the plunger means is moved to a third position, and means for holding the seal means in cooperating relation with the plunger means when the plunger means is in the third position.

30. The apparatus of claim 29 wherein: the plunger means has a collar having a groove, said seal means being an O-ring located in said groove, said means for holding the seal means including ribs on the body means to prevent the O-ring from moving out of the groove.

31. The apparatus of claim 23 including: means in the passage in the body means to restrict the flow of fluid through said passage in the body means.

32. An air pressure testing apparatus for indicating air pressure in a pneumatic tire or the like having a valve stem with a normally closed air valve comprising: body means connected to the valve stem, said body means having a passage in communication with the air valve, housing means surrounding the body means, said housing means having an inside wall spaced from the body means forming an annular chamber and a transparent section, annular piston means located in said annular chamber, passage means connecting the chamber with the passage in the body means, first color means on first portions of the piston means and second color means on second portions of the piston means, biasing means yieldably holding the piston means in a first position wherein said first color means is visually observable through the transparent section, plunger means extended through said passage of the body means and normally spaced from the air valve, said plunger means movable from a first position to a second position to engage the air valve to open the air valve whereby air under pressure from the tire exerts a force on the annular piston means, when said force on the piston means is greater than the force of the biasing means, the piston means moves to a second position wherein said second color means is visually observable through the transparent section, said plunger means being movable from the second position to a third position wherein air under presure from an outside source can be introduced through the apparatus into the container or exhausted through the apparatus to the atmosphere.

33. The apparatus of claim 32 wherein: said passage is open to the atmosphere, and seal means cooperating with the plunger means and housing means to seal said passage when the plunger means is in the second position and open said passage when the plunger means is moved from the second position to a third position.

34. The apparatus of claim 32 wherein: said transparent section of the housing means has a plurality of annular outwardly directed beads, said first color means being a colored band transversely aligned with said beads when the piston means is in the first position, and said second color means being a colored band transversely aligned with said beads when the piston is in the second position.

35. An air pressure testing apparatus for indicating air pressure in a pneumatic tire or the like having a valve stem with a normally closed air valve comprising: body means connected to the valve stem, said body means having a passage in communication with the air valve, housing means surrounding the body means, said housing means having an inside wall spaced from the body means forming an annular chamber and a transparent section, annular piston means located in said annular chamber, passage means connecting the chamber with the passage in the body means, first color means on first portions of the piston means and second color means on second portions of the piston means, biasing means yieldably holding the piston means in a first position wherein said first color means is visually observable through the transparent section, plunger means extended through said passage of the body means and normally spaced from the air valve, said plunger means movable from a first position to a second position to engage the air valve to open the air valve whereby air under pressure from the tire exerts a force on the annular piston means, when said force on the piston means is greater than the force of the biasing means, the piston means moves to a second position wherein said second color means is visually observable through the transparent section, a first seal between the wall and the annular piston means, and a second seal between the annular piston means and body means.

36. The apparatus of claim 35 wherein: each seal is an O-ring located in a groove, said groove being larger than the diameter of the O-ring and smaller in diameter than the inside diameter of the O-ring whereby the O-ring has limited movement in the groove.

37. An air pressure testing apparatus for indicating air pressure in a pneumatic tire or the like having a valve stem with a normally closed air valve comprising: body means connected to the valve stem, said body means having a passage in communication with the air valve, housing means surrounding the body means, said housing means having an inside wall spaced from the body means forming an annular chamber and a transparent section, annular piston means located in said annular chamber passage means connecting the chamber with the passage in the body means, first color means on first portions of the piston means and second color means on second portions of the piston means, biasing means yieldably holding the piston means in a first position wherein said first color means is visually observable through the transparent section, plunger means extended through said passage of the body means and normally spaced from the air valve, said plunger means movable from a first position to a second position to engage the air valve to open the air valve whereby air under pressure from the tire exerts a force on the annular piston means, when said force on the piston means is greater than the force of the biasing means, the piston means moves to a second position wherein said second color means is visually observable through the transparent section, said passage being open to the atmosphere, and seal means cooperating with the plunger means and housing means to seal said passage when the plunger means is in the second position.

38. A fluid pressure testing apparatus for indicating the pressure of a fluid in a container having a normally closed valve connected to the container comprising: first means in fluid communiction with said valve; housing means mounted on the first means, said housing means having a viewing section, means for opening the valve to allow fluid under pressure to flow from the container into the housing means, second means movable relative to the viewing section in response to pressure of fluid in said housing means, said second means having information means indicating the pressure of the fluid in the housing means, said viewing section including a transparent section having at least one annular outwardly directed bead, said bead providing an optical structure for viewing the information means whereby the pressure of the fluid in the housing means is visually indicated.

39. The apparatus of claim 38 wherein: said transparent section has a plurality of annular outwardly directed beads.

40. The apparatus of claim 39 wherein: each bead has a semi-circular longitudinal sectional shape.

41. The apparatus of claim 38 wherein: said information means are separate circumferential colored bands mounted on outside portions of the second means.

42. The apparatus of claim 38 wherein: said housing means has an inside cylindrical wall of transparent material, a plurality of longitudinally spaced bands of opaque material attached to said inside wall, said second means having first and second information means, said first information means being longitudinally spaced first colored bands longitudinally spaced from the opaque bands on the housing means, said second information means being longitudinally spaced second colored bands longitudinally aligned with the opaque bands on the housing means when the second means is in a first non-testing position, said second colored bands being longitudinally aligned with the spaces between said bands when the second means is in a second pressure testing position.

43. The apparatus of claim 38 wherein: said housing means has a plurality of annular outwardly directed beads longitudinally aligned with the spaces between the opaque bands.

44. A fluid pressure testing apparatus for indicating the pressure of a fluid in a container having a normally closed valve connected to the container comprising: first means having a passage in communication with the valve and the atmosphere, and a viewing section extended around the first means whereby the viewing section can be visually observed all around the first means, second means operatively associated with said first means to provide visual information observable through the viewing section as to the pressure of the fluid in the container, plunger means extended through said passage of the first means, said plunger means movable from a first position to a second position to open the valve whereby fluid under pressure from the container actuates the second means to provide a visual indication of the pressure of the fluid in the container, said plunger means being movable from a second position to a third position to open said valve and provide a passage to the atmosphere for fluid in said container.

45. The apparatus of claim 44 including: biasing means for biasing said plunger means away from said valve toward the first position.

46. The apparatus of claim 44 including: seal means for closing said passage when the plunger means is in the second position and open said passage when the plunger means is in the third position.

47. The apparatus of claim 44 wherein: said plunger means includes a head, and a cap means mounted on the second means defining a chamber and having an opening to the atmosphere, said head engageable with said cap means to close said opening when the plunger means is in the first position.

48. A fluid pressure testing apparatus for indicating the pressure of a fluid in a container having a normally closed valve connected to the container comprising: first means having a passage in communication with the valve and the atmosphere, second means operatively associated with said first means to provide visual information as to the pressure of the fluid in the container, plunger means extended through said passage of the first means, said plunger means movable from a first position to a second position to open the valve whereby fluid under pressure from the container actuates the second means to provide a visual indication of the pressure of the fluid in the container, said plunger means being movable from a second position to a third position to open said valve and provide a passage to the atmosphere for fluid in said container, seal means for closing said passage when the plunger means is in the second position and open said passage when the plunger means is in the third position, and means for holding the seal means in cooperative relation with the plunger means when the plunger means is in the third position.

49. The apparatus of claim 48 wherein: the means for holding the seal means includes ribs on the first means.

* * * * *

UNITED STATES PATENT AND TRADEMARK OFFICE
CERTIFICATE OF CORRECTION

PATENT NO. : 3,889,530
DATED : June 17, 1975
INVENTOR(S) : Gary R. Bluem

It is certified that error appears in the above-identified patent and that said Letters Patent are hereby corrected as shown below:

Column 4, line 12, "provding" should be --providing--.

Column 6, line 28, "64" should be --63--.

Column 7, line 21, "apartus" should be --apparatus--.

Column 7, line 65, "from" should be --form--.

Column 8, line 38, "57" should be --157--.

Column 8, line 39, "lins" should be --lines--.

Column 9, line 55, "162" should be --161--.

Column 10, line 67, insert --are-- after "132".

Column 13, line 12, "comprsing" should be --comprising--.

Column 16, line 66, "communiction" should be --communication--.

Signed and Sealed this twenty-fifth Day of November 1975

[SEAL]

Attest:

RUTH C. MASON
Attesting Officer

C. MARSHALL DANN
Commissioner of Patents and Trademarks